(12) United States Patent
Saito et al.

(10) Patent No.: US 8,020,682 B2
(45) Date of Patent: Sep. 20, 2011

(54) SYNCHRONIZER DEVICE

(75) Inventors: Daisuke Saito, Okazaki (JP); Yukio Ueda, Toyoake (JP); Yuji Gatade, Yokohama (JP)

(73) Assignees: Aisin AI Co., Ltd., Nishio-Shi, Aichi-Ken (JP); Kyowa Metal Works Co., Ltd., Yokohama-Shi, Kanagawa-Ken (JP)

( * ) Notice: Subject to any disclaimer, the term of this patent is extended or adjusted under 35 U.S.C. 154(b) by 967 days.

(21) Appl. No.: 11/979,271

(22) Filed: Oct. 31, 2007

(65) Prior Publication Data
US 2008/0135368 A1    Jun. 12, 2008

(30) Foreign Application Priority Data
Oct. 31, 2006   (JP) .................................. 2006-296229

(51) Int. Cl.
*F16D 23/06* (2006.01)
(52) U.S. Cl. ..................................... 192/53.362; 74/339
(58) Field of Classification Search ............... 192/53.34, 192/53.362; 74/339
See application file for complete search history.

(56) References Cited

U.S. PATENT DOCUMENTS

| | | | | |
|---|---|---|---|---|
| 1,901,712 A | * | 3/1933 | Christman | ............... 192/53.362 |
| 4,526,052 A | * | 7/1985 | Hiraiwa | ........................... 74/339 |
| 5,695,033 A | * | 12/1997 | Hiraiwa | ..................... 192/53.32 |
| 6,244,404 B1 | * | 6/2001 | Kim | ............................ 192/53.34 |
| 6,848,554 B2 | * | 2/2005 | Youk | ........................ 192/53.362 |
| 2008/0081726 A1 | * | 4/2008 | Saito et al. | .................... 475/331 |

FOREIGN PATENT DOCUMENTS

| | | |
|---|---|---|
| JP | 9-89002 A | 3/1997 |
| JP | 2002-039212 A | 2/2002 |
| JP | 2004-44648 A | 2/2004 |

OTHER PUBLICATIONS

Official Action issued by the Japanese Patent Office on May 31, 2011, with English language translation, in corresponding Japanese Patent Application No. 2006-296229.

* cited by examiner

*Primary Examiner* — David D Le
*Assistant Examiner* — Terry Chau
(74) *Attorney, Agent, or Firm* — Buchanan Ingersoll & Rooney PC (57) ABSTRACT

A synchronizer device includes a first rotating member provided at a shaft, a second rotating member rotatably provided at the shaft and including a conical body on which an outer conical surface is formed, a synchronizer ring having an inner conical surface contacting the outer conical surface, and arranged between the first and the second rotating members, the synchronizer ring being movable in an axial direction of the first rotating member and integrally rotated with the first rotating member, a sleeve provided at an outer circumference of the first rotating member, and the sleeve being slidable in the axial direction of the first rotating member, a lever provided at an inner circumference of the sleeve and arranged between the first rotating member and the synchronizer ring, and a retracting member including an outwardly biasing portion and a retracting biasing portion for biasing the lever away from the synchronizer ring.

4 Claims, 6 Drawing Sheets

SYNCHRONIZER DEVICE

CROSS REFERENCE TO RELATED APPLICATIONS

This application is based on and claims priority under 35 U.S.C. §119 to Japanese Patent Application 2006-296229, filed on Oct. 31, 2006, the entire contents of which is incorporated herein by reference.

FIELD OF THE INVENTION

The present invention relates to a synchronizer device that synchronizes a rotational speed of one rotational member with a rotational speed of another rotational member, such as gears provided at a transmission and the like, being rotated relative to each other.

BACKGROUND

A transmission is a device in which ratio between a rotational speed of an input shaft and a rotational speed of an output shaft is changeable into several ratios. For example, the transmission is used for, for example, transmitting rotational torque of an engine of a vehicle to a driving wheel at a gear ratio selected depending on running condition of the vehicle. There are several methods for changing gear ratio. For example, there is a transmission that accordingly selects an appropriate gear ratio from gear combinations. The gear combinations, each of which has a different gear ratio, are established within the transmission.

A synchromesh-type transmission having a synchronizer device for achieving smooth shift of the gear combinations is known. The synchronizer device includes a torque transmitting shaft, a clutch hub, a pair of gears and a pair of synchronizer rings. The clutch hub is spline-engaged with the torque transmitting shaft. Each of the pair of the gears is loosely fitted on the torque transmitting shaft and is arranged at each side of the clutch hub. Each of the pair of the synchronizer rings is slidably provided at each of the pair of the gears.

Specifically, the Borg-Warner type synchronizer device, which does not engage the clutch hub and the gear until a synchronizing operation is completed, is well known. Further, a lever-type synchronizer device disclosed in, for example, JP1997089002 and in JP 2004044648A is also adopted to a transmission. The lever-type synchronizer device has a simpler configuration comparing to the Borg-Warner type synchromesh, furthermore, the lever-type synchromesh achieves the same synchronizing operation as the Borg-Warner type synchromesh conducts with less operating force by utilizing a so-called principle of leverage.

Figure 4A:
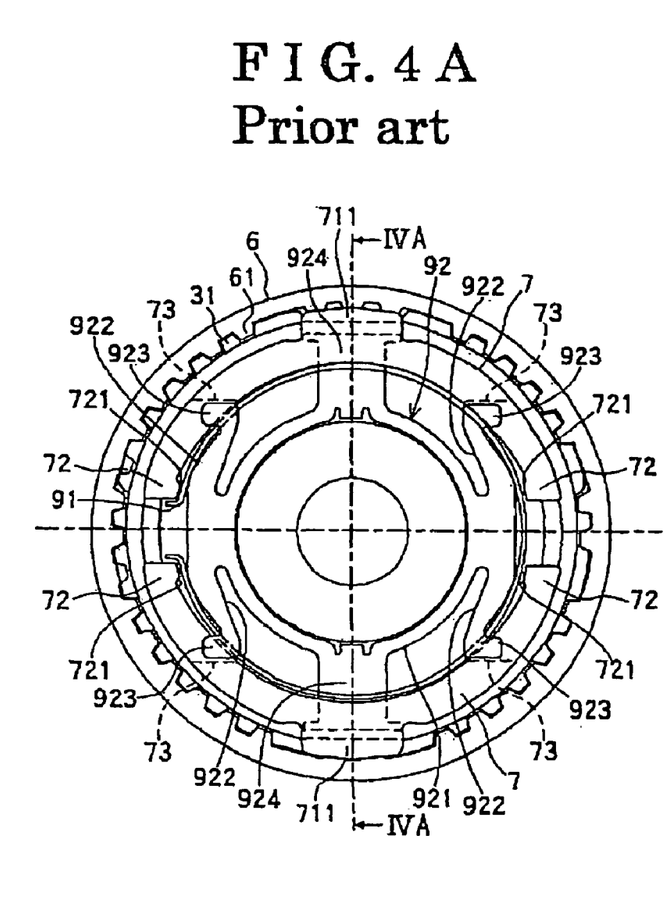
FIG. 4A is a partial cross-sectional diagram illustrating a configuration of synchromesh of a prior art.
Figure 4B:
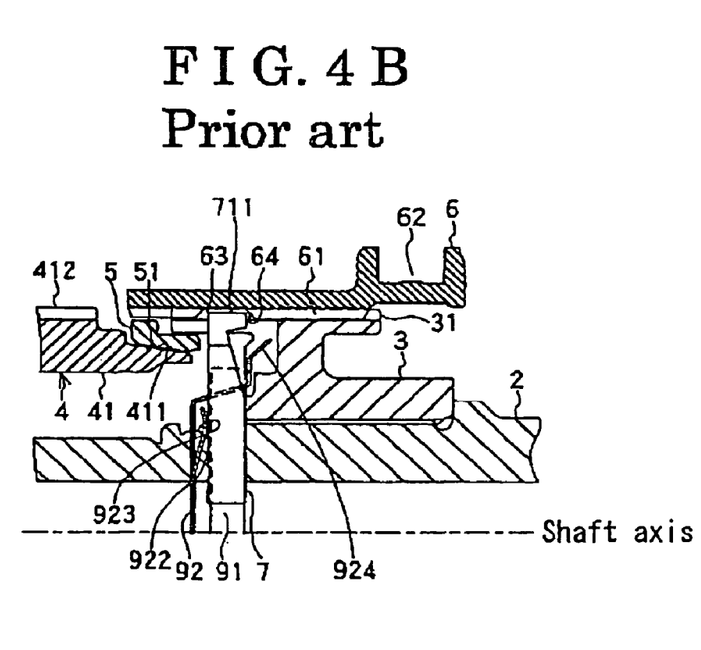
FIG. 4B is a partial cross-sectional diagram illustrating the configuration of the prior art taken along line IVB-IVB of FIG. 4A.
Figure 5:
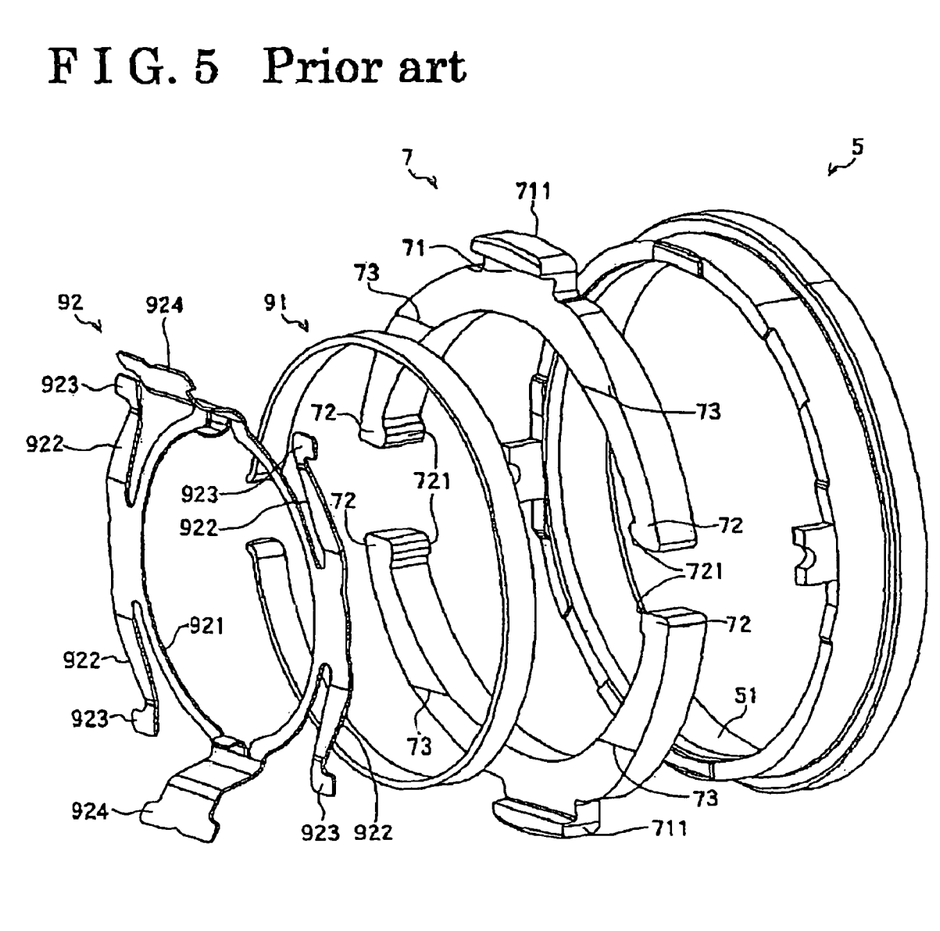
FIG. 5 is a perspective view of components of the prior art.
Figure 6A:
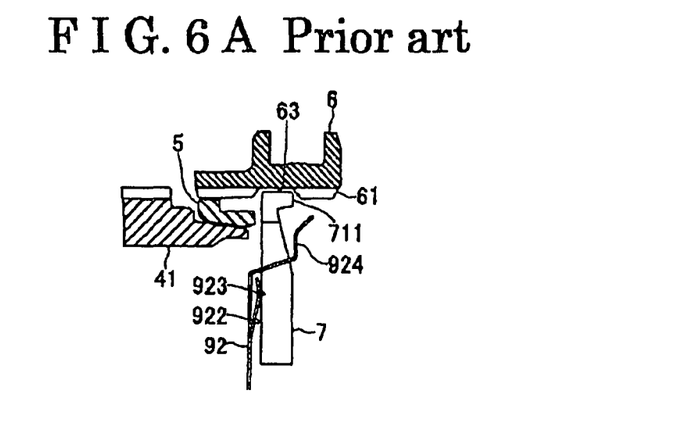
FIG. 6A is a diagram schematically illustrating the prior art in a neutral state.
Figure 6B:
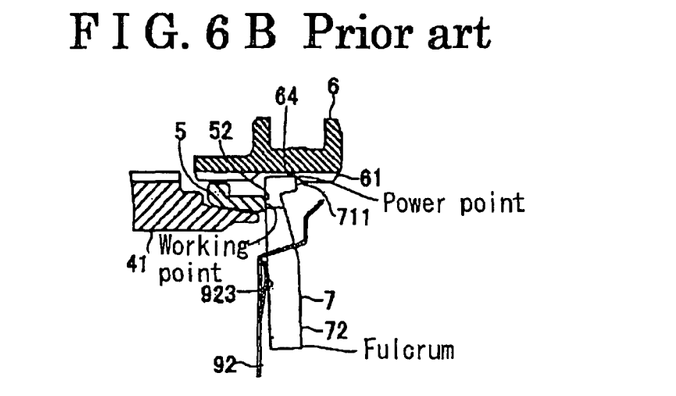
FIG. 6B is a diagram schematically illustrating a state of the prior art when a shift change operation is conducted.
Figure 6C:
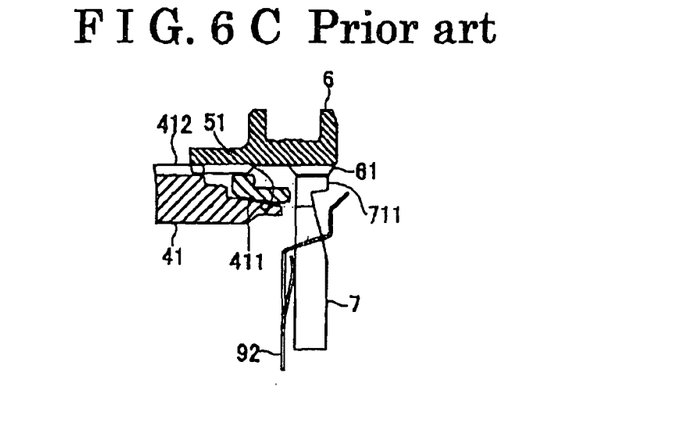
FIG. 6C is a diagram schematically illustrating a state of the prior art after the shift change operation is completed.

Taking a synchromesh provided at an automobile as an example, the synchronizing operation of the lever-type synchromesh will be briefly described in accordance with FIGS. 4, 5 and 6 of the attached drawings. Not all components, but only major components of the synchromesh are illustrated in FIGS. 4, 5 and 6. Several lever-type synchronizer devices are provided at necessary portions of the transmission for synchronizing rotations.

The known lever-type synchronizer device includes a shaft 2 to which the rotational torque of the engine is transmitted, a clutch hub 3 (a first rotating member) fixed at the shaft 2, a gear 4 (a second rotating member) rotatably provided at the shaft 2, a synchronizer ring 5, a C-shaped spring 91, a retracting spring 92, a lever 7 and a sleeve 6 provided at the outermost circumference of the lever-type synchronizer device so as to be slidable along outer circumferences of the clutch hub 3 and the gear 4 in an axial direction of the shaft 2. Starting from the left in FIG. 4A, the synchronizer ring 5, the C-shaped spring 91 and the retracting spring 92 are arranged in this order between the clutch hub 3 and the gear 4. The lever-type synchronizer ring changes a state between the clutch hub 3 and the gear 4 either to a connected state or to a neutral state. The connected state is a state where the lever-type synchronizer device synchronizes clutch hub 3 and the gear 4 that are relatively rotatable in order to integrally rotate the clutch hub 3 and the gear 4. The neutral state is a state where the lever-type synchronizer device disengages connection between the clutch hub 3 and the gear 4 so that the clutch hub 3 and the gear 4 are rotated relative to each other.

A spline 31 is formed on the outer circumference of the clutch hub 3.

A gear body (not shown) and a gear piece 41 (conical body) are integrally formed on the gear 4. The gear body is rotatably supported at the shaft 2 by means of a bearing (not shown). An outer conical surface 411 is formed on one end portion of the gear piece 41 facing the clutch hub 3. A teeth portion 412 is formed on an outer circumference of the other end portion of the gear piece 41. An external diameter of the teeth portion 412 is formed to be equal to an external diameter of the spline 31.

The synchronizer ring 5 includes an inner conical surface 51 contacting the outer conical surface 411 of the gear piece 41 of the gear 4. The synchronizer ring 5 is arranged between the clutch hub 3 and the gear 4 so as to be movable in an axial direction of the shaft 2 relative to the clutch hub 3, and so that the rotation of the synchronizer ring 5, is synchronized with the rotation of the clutch hub 3.

A spline 61 is formed on an inner circumferential surface of the sleeve 6. The spline 61 is engaged with the spline 31 formed on the outer circumference of the clutch hub 3 so that the sleeve 6 is integrally rotated with the clutch hub 3. The sleeve 6 is slidable along the spline 31 of the clutch hub 3 in accordance with an operation of a shift lever (not shown). The sleeve 6 is slidably moved in the axial direction of the shaft 2 to the left in FIG. 4A, and then the sleeve 6 eventually reaches the teeth portion 412 formed on the outer circumference of the gear piece 41 so that the sleeve 6 indirectly connects the spline 31 and the teeth portion 412 in order to synchronize a rotation of the clutch hub 3 with a rotation of the gear 4. As a result, the clutch hub 3 and the gear piece 41 are integrally rotated. Additionally, a recessed portion 63 is formed on the approximately middle of the spline 61 of the sleeve 6 in the axial direction of the shaft 2. Specifically, in this embodiment, as illustrated in FIG. 4A, two recessed portions 63 are formed on the spline 61 so as to face each other.

The lever 7 is arranged between the clutch hub 3 and the synchronizer ring 5. The lever 7 is rotated in the same manner as the clutch hub 3 being rotated, and the lever 7 presses the synchronizer ring 5 towards the gear 4 by the principle of leverage. As illustrated in FIGS. 4A and 5, the lever 7 is formed with an upper half ring-shaped portion and a lower half ring-shaped portion. A key portion 711 is formed on a top portion 71 of each of the upper and the lower half ring-shaped portions along an outer circumference thereof. Further, a protruding portion 721 is formed on one end portion and the other end portion of the upper half ring-shaped portion so as to protrude towards the shaft 2. Similarly, the protruding portion 721 is formed on one end portion and the other end portion of the lower half ring-shaped portion so as to protrude towards the shaft 2.

When the synchromesh is in a neutral state, the key portions 711 are engaged with the recessed portions 63 of the sleeve 6 respectively. As illustrated in FIG. 4B, an inclined surface 64 is formed on one end wall (on the left of the recessed portion 63 in FIG. 4B) and another end wall (on the right of the recessed portion 63 in FIG. 4B) of each of the recessed portions 63 in the axial direction of the shaft 2.

The C-shaped spring 91 is made of a ring-shaped member, and an opening is formed on the C-shaped spring 91. Further, the C-shaped spring 91 is fitted along the inner circumferential surface of the lever 7. The C-shaped spring biases the lever 7 outwardly towards the sleeve 6 (in a radial direction of the lever 7) by elasticity of the C-shaped spring 91.

The retracting spring 92 includes a flat portion 921 formed in a flat ring-shape arranged between the synchronizer ring 5 and the lever 7, and further, the retracting spring 92 includes four leg portions 922 that are diverged from the flat portion 921. As illustrated in FIG. 4A, two of the four leg portions 922 are diverged from a right top portion of the flat portion 921 in FIG. 4A and another two of the four leg portions 922 are diverged from a left top portion of the flat portion 921 in FIG. 4A. A pressing portion 923 is formed on end portion of each of the leg portions 922 that presses the lever 7 towards the clutch hub 3 by elasticity of each of the pressing portion 923. Furthermore, the retracting spring 92 includes fixing portions 924 on an upper top portion and a bottom top portion of the retracting spring 92 for fixing the retracting spring 92 to the clutch hub 3, as illustrated in FIG. 4B. Further, the fixing portions 924 restrain rotation of the retracting spring 92 by fixing the retracting spring 92 to the clutch hub 3. The fixing portions 924 are formed so as to extend through an inner circumference of the lever 7 towards the clutch hub 3.

Synchronizing operation of the lever-type synchronizer device of the known art will be described below in accordance with FIG. 6. Specifically, the synchronizing operation will be described with the upper half ring-shaped portion of the lever 7 as an example. Hereinbelow, the upper half ring-shaped portion is referred to simply as the lever 7 for convenience. The lever-type synchronizer device of the known art is operated in accordance with sliding movement of the sleeve 6. The sleeve 6, the lever 7, the retracting spring 92, the synchronizer ring 5 and the gear piece 41 are schematically illustrated in FIG. 6.

In the neutral state before the sleeve 6 is slid, as illustrated in FIG. 6A, the key portion 711 of the lever 7 is engaged with the recessed portion 63 of the spline 61 formed on the sleeve 6. In this state, the clutch hub 3 (not shown in FIG. 6A) and the gear piece 41 are not integrally rotated.

When the lever-type synchronizer device is in the neutral state, the lever 7 is retained between the clutch hub 3 and the synchronizer ring 5, and the lever 7 receives biasing force from the C-shaped spring 91 outwardly towards the sleeve 6. At the same time, the lever 7 is biased by the retracting spring 92 towards the clutch hub 3 at places where the lever 7 has a constant thickness. Hence, the lever 7 always closely contacts the clutch hub 3.

When the sleeve 6 is slidably moved towards the gear piece 41 in the axial direction of the shaft 2 from the neutral state, as illustrated in FIG. 6B, the inclined surface 64 press-contacts the key portion 711 of the lever 7. As a result, the lever 7 is pressed towards the gear piece 41 in a sliding direction of the sleeve 6 so as to resist the biasing force applied by the retracting spring 92. The lever 7 transmits pressing force received at the inclined surface 64 to the synchronizer ring 5. The pressing force is generated by the sleeve 6 being moved towards the gear piece 41 so as to engage the inclined surface 64 of the spline 61 formed on the sleeve 6 with the key portion 711 of the lever 7. Specifically, the key portion 711 of the lever 7 functions as a point where the pressing force is applied (power point), the end portions 72 function as fulcrum, and the top portion 71 of the half-ring shaped portion functions as a point of application of the pressing force (working point) to which the pressing force of the sleeve 6 is transmitted via the lever 7. The lever 7 transmits the pressing force of the sleeve 6 using the power point, the fulcrum and the working point to a contacting surface 52 of the synchronizer ring 5. The contacting surface 52 contacts the top portion 71 of the half ring-shaped portion of the lever 7 facing the ring gear 41.

The synchronizer ring 5 is moved towards the gear piece 41 by receiving the pressing force at the contacting surface 52. When the sleeve 6 is further moved towards the gear piece 41, as illustrated in FIG. 6C, the key portion 711 of the lever 7 is disengaged from the inclined surface 64 against the biasing force of the C-shaped spring 92 being applied outwardly towards the sleeve 6 (in the radial direction of the sleeve 6), and then the key portion 711 of the lever 7 is inserted along an inner circumference of the spline 61 of the sleeve 6.

When the lever 7 is inserted along the inner circumference of the spline 61 of the sleeve 6, radius of the C-shaped spring 91 is narrowed so as to narrow or close the opening of the C-shaped spring 91. Therefore, the key portion 711 of the half ring-shaped portion is disengaged from the inclined surface 64 of the spline 64 formed on the sleeve 6. As a result, the pressing force of the sleeve 6 is not applied to the half ring-shaped portion of the lever 7.

In the above-mentioned manner, the synchronizing operation between the clutch hub 3 and the gear piece 4 is implemented by gradually increasing frictional force generated by the inner conical surface 51 of the synchronizer ring 5 being pressed with the outer conical surface 411 of the gear piece 41. After the synchronizing operation is completed, the sleeve 6 is further slid towards the gear piece 41, and then a shifting operation is completed.

The synchronizing operation for synchronizing the clutch hub 3 and the gear 4 is completed with the synchronizer ring 5, the lever 7, the C-shaped spring 91 and the retracting spring 92.

The known lever-type synchronizer device includes the synchronizer ring 5, the lever 7, the C-shaped spring 91 and the retracting spring 92 as main components for the synchronizing operation in order to fulfill the synchronizing function. In other words, the number of components used for the known lever-type synchronizer device tends to increase, which may increase manufacturing costs of the lever-type synchronizer device.

A need exists for a synchromesh which is not susceptible to the drawback mentioned above.

SUMMARY OF THE INVENTION

According to an aspect of the present invention, a synchronizer device includes a first rotating member provided at a shaft, a second rotating member rotated relative to a shaft axis of the shaft, and including a conical body facing the first rotating member, the conical body forming an outer conical surface, a synchronizer ring having an inner conical surface contacting the outer conical surface of the conical body of the second rotating member, and arranged between the first rotating member and the second rotating member, the synchronizer ring being movable in an axial direction of the first rotating member and integrally rotated with the first rotating member, a sleeve provided at an outer circumference of the first rotating member, and the sleeve being slidable in the axial direction of the first rotating member, a lever provided at an inner circumference of the sleeve and arranged between the first rotating member and the synchronizer ring, the lever including a power point at which the lever receives a pressing force in accordance with the sliding movement of the sleeve towards the second rotating member, the lever pressing the synchronizer ring towards the second rotating member by using the principle of leverage, and a retracting member including an outwardly biasing portion for pressing the lever outwardly towards the sleeve and a retracting biasing portion for biasing the lever away from the synchronizer ring, the outwardly biasing portion and the retracting biasing portion are integrally formed on the retracting member.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

An embodiment of a synchronizer device related to the present invention will be described in detail as a component of a transmission that transmits rotational torque of an engine of a vehicle to driving wheels. Referring to the drawings, identical reference numeral designations may indicate the same or corresponding parts as the known art described in the background through the several views.

Figure 1A:
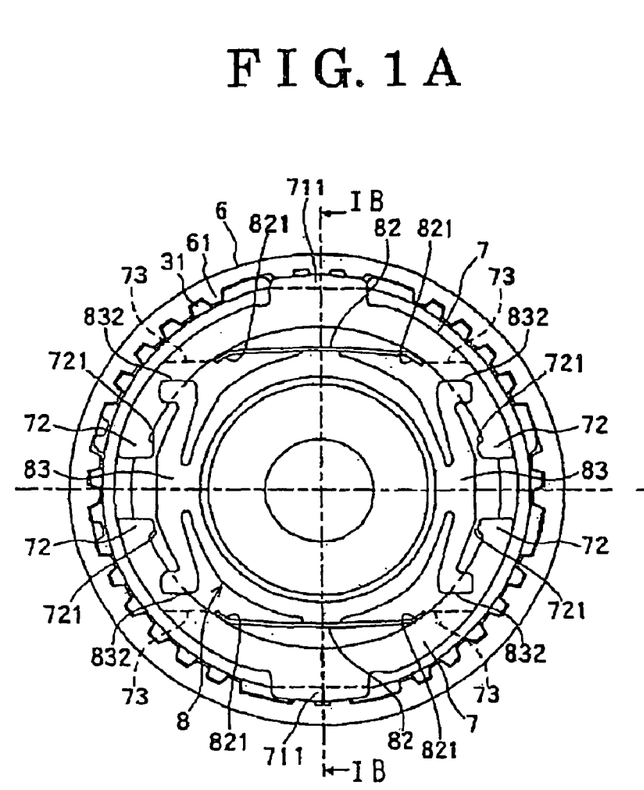
FIG. 1A is a partial cross-sectional diagram illustrating a configuration of a synchromesh adopted to a transmission.

The synchromesh 1 adopted to the transmission includes a shaft 2 to which the rotational torque of the engine is transmitted, a clutch hub 3 (a first rotating member) fixed at the shaft 2, a gear 4 (a second rotating member) rotatably supported at the shaft 2 so as to be rotated relative to the clutch hub 3, a synchronizer ring 5 arranged between the gear 4, a lever 7, a multifunctional spring (a retracting member) 8, and a sleeve 6 that is provided at an outer circumference of the clutch hub 3 so as to be slidable along an outer circumference of the clutch hub 3 in an axial direction of the shaft 2. In this embodiment, the clutch hub 3 is fixed at the shaft 2 so that the clutch hub 3 is integrally rotated with the shaft 2, and the gear 4 is rotated relative to a shaft axis of the shaft 2.

A spline 31 is formed on the outer circumference of the clutch hub 3.

A gear body (not shown) and a gear piece 41 (conical body) are integrally formed on the gear 4. The gear body is rotatably supported at the shaft 2 by means of a bearing (not shown). An outer conical surface 411 is formed on one end portion of the gear piece 41 facing the clutch hub 3. A teeth portion 412 is formed on an outer circumference of the other end portion of the gear piece 41. An external diameter of the teeth portion 412 is formed to be equal to an external diameter of the spline 31 of the clutch hub 3.

The synchronizer ring 5 includes an inner conical surface 51 contacting the outer conical surface 411 of the gear piece 41 of the gear 4. The synchronizer ring 5 is arranged between the clutch hub 3 and the gear 4 so as to be movable in an axial direction of the shaft 2 relative to the clutch hub 3, and so that the synchronizer ring 5 is integrally rotated with the clutch hub 3. When the inner conical surface 51 is fitted along the outer conical surface 411, friction is generated between the synchronizer ring 5 and the gear piece 41. Synchronizing operation for synchronizing the rotation of the clutch hub 3 with the rotation of the gear 4 is implemented based on frictional force generated therebetween.

A spline 61 is formed on an inner circumferential surface of the sleeve 6. The spline 61 is engaged with the spline 31 formed on the outer circumference of the clutch hub 3 so that the sleeve 6 is integrally rotated with the clutch hub 3. The sleeve 6 is slidable along the spline 31 of the clutch hub 3 in the axial direction of the shaft 2. The sleeve 6 is formed slidable to a point where the sleeve 6 reaches the teeth portion 412 formed on the outer circumference of the gear piece 41 so that the sleeve indirectly connects the spline 31 and the teeth portion 412 in order to synchronize the rotation of the clutch hub 3 and the rotation of the gear 4. As a result, the clutch hub 3 and the gear 4 are integrally rotated.

Additionally, a circumferential groove 62 is formed along an outer circumference of the sleeve 6 so that sleeve 6 is engaged with a shift fork (not shown). The sleeve 6 is slid in the axial direction of the shaft 2 in accordance with an operation of a shift lever (not shown) that is connected to the shift fork. Further, a recessed portion 63 is formed on an approximately middle of the spline 61 of the sleeve 6 in the axial direction of the shaft 2. Specifically, in this embodiment, as illustrated in FIG. 1A, two recessed portions 63 are formed on the spline 61 so as to face each other.

Figure 2:
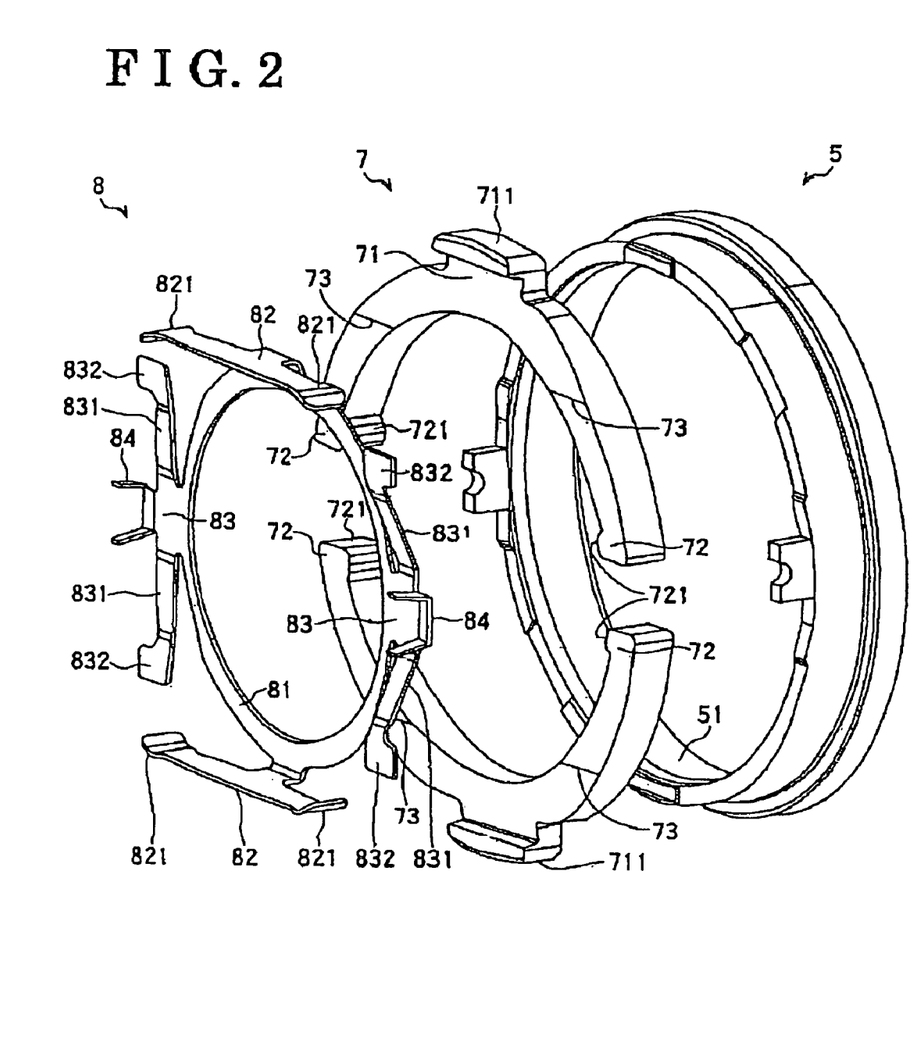
FIG. 2 is a perspective view of components of the synchromesh.

The lever 7 is arranged between the clutch hub 3 and the synchronizer ring 5. The lever 7 is rotated in the same manner as the clutch hub 3 being rotated, and the lever 7 presses the synchronizer ring 5 towards the gear 4 by the principle of leverage. As illustrated in FIGS. 1A and 2, the lever 7 is formed with an upper half ring-shaped portion and a lower half ring-shaped portion. A key portion 711 is formed on a top portion 71 of each of the upper and the lower half ring-shaped portions along an outer circumference thereof. Further, a protruding portion 721 is formed on one end portion and the other end portion of the upper half ring-shaped portion so as to protrude towards the shaft 2. Similarly, the protruding portion 721 is formed on one end portion and the other end portion of the lower half ring-shaped portion so as to protrude towards the shaft 2.

Figure 1B:
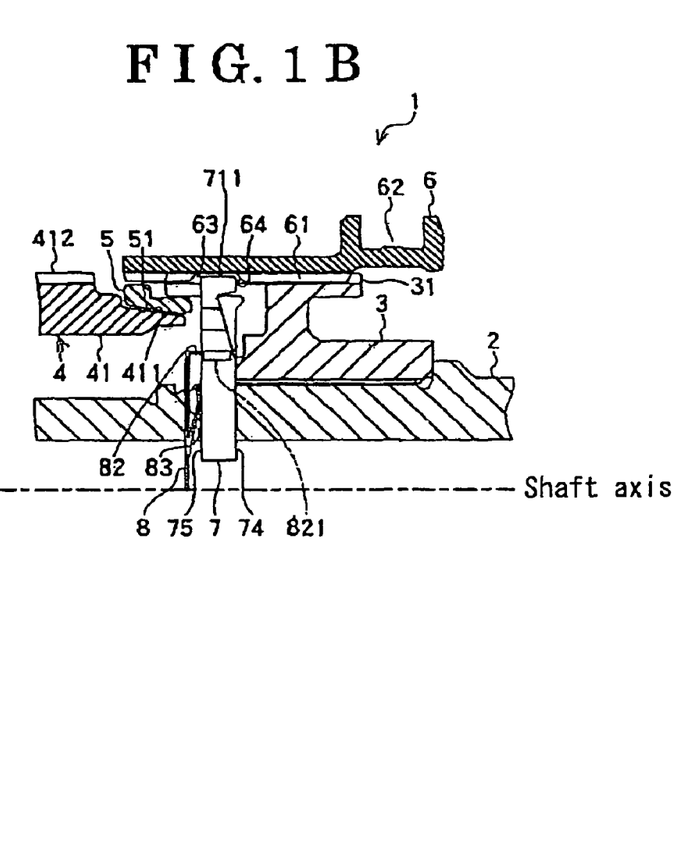
FIG. 1B is a partial cross-sectional diagram illustrating the configuration of the synchromesh taken along line IB-IB of FIG. 1A.

When the synchromesh is in a neutral state, the key portions 711 are engaged with the recessed portions 63 of the sleeve 6 respectively. As illustrated in FIG. 1B, an inclined surface 64 is formed on one end wall (on the left of the recessed portion 63 in FIG. 1B) and another end wall (on the right of the recessed portion 63 in FIG. 1B) of each of the recessed portions 63 in the axial direction of the shaft 2. Each of the upper and the lower half ring-shaped portions of the lever 7 has a surface, which is referred to as a front surface 74 for convenience, facing the clutch hub 3. The front surface 74 inclines from a border portion 73 towards the top portion 71 of each of the upper and the lower half ring-shaped portions of the lever 7. The border portion 73 runs straight along the front surface 74 of each of the upper and the lower half ring-shaped portions of the lever 7 as illustrated in FIG. 2. A flat surface formed on each of the upper and the lower half ring-shaped portion of the lever 7 facing the synchronizer ring 5 is referred to as a rear surface 75 for convenience.

When the key portion 711 of each of the upper and the lower half ring-shaped portions of the lever 7 receives pressing force towards the gear 4 under circumstances where the lever 7 is arranged so that the front surface 74 faces the clutch hub 3 and the rear surface 75 faces the synchronizer ring 5, each of the upper and the half ring-shaped portions of the lever 7 is tilted towards the gear 4 with the end portions 72 of the front surface 74 as a fulcrum, and then the each of the upper and the lower half ring-shaped portions presses the synchronizer ring 5 towards the gear 4 with the top portion 71 of each of the upper and the lower half ring-shaped portions as a point of application of the pressing force (working point).

Further, when the key portion 711 of each of the upper and the lower half ring-shaped portions of the lever 7 receives the pressing force towards the clutch hub 3, each of the upper and the lower half ring-shaped portions of the lever 7 is tilted towards the clutch hub 3 is tilted about the border portion 73 as a fulcrum so as to be moved back and forth in a seesaw manner, and then each of the upper and the lower half ring-shaped portions of the lever 7 presses the synchronizer ring 5 towards the gear 4 at the end portions 72 of the rear surface 73 functioning as a point of application of the pressing force (working point). Hence, in any case where each of the upper and the lower half ring-shaped portions of the lever 7 is tilted either towards the gear 4 or towards the clutch hub 3, the lever 7 presses the synchronizer ring 5 towards the gear 4. Therefore, the lever 7 also functions as a bi-directionally tiltable lever.

The multifunctional spring 8 made of a sheet material is fitted into an inner circumferential surface of the lever 7. Further, the multifunctional spring 8 includes a main body portion 81 formed in a ring shape, a pair of outwardly biasing portions 82 facing each other, a pair of retracting biasing portions 83 facing each other, and a pair of fixing portions 84 facing each other. The pair of the outwardly biasing portions 82 biases the lever 7 outwardly towards the sleeve 6. The pair of the retracting basing portions 83 biases the lever 7 away from the synchronizer ring 5, in other words, the pair of the retracting biasing portions 83 biases the lever 7 towards the clutch hub 3. The pair of the fixing portions 84 fixes the multifunctional spring 8 to the clutch hub 3 in order to restrain the rotation of the multifunctional spring 8.

Each of the outwardly biasing portions 82 extends from the main body portion 81, and further each of the outwardly biasing portions 82 having a base portion thereof is bent so as to extend towards the clutch hub 3. End portions 821 formed on each of the upwardly biasing portions 82 contact the inner circumferential surface of the lever 7, and further the end portions 821 press the lever 7 outwardly towards the sleeve 6. The end portions 821 formed on each of the outwardly biasing portions 82 are deformed inwardly towards the shaft axis of the shaft 2 when the lever 7 presses the end portions 821 inwardly towards the shaft axis.

Each of the retracting biasing portions 83 protrudes from the main body 81 so as to be perpendicular to the upwardly biasing portion 82. Further, two leg portions 831 are integrally formed on each of the retracting biasing portions 83 so as to extend substantially along an outer circumference of the main body portion 81. A pressing portion 832 is formed on each of the leg portions 831 so that each pressing portions 832 presses the lever 7. The retracting biasing portions 83 biases the lever 7 towards the clutch hub 3 based on elastic deformation of the leg portions 831 caused by reaction force generated when the pressing portions 823 press the lever 7. Each of the fixing portions 84 are formed on a further outer circumference of each of the retracting biasing portions 83, and further, each of the fixing portions 84 are formed in a substantially U-shape.

Synchronizing operation of the synchromesh 1 employed to the transmission will be described below in accordance with FIG. 3. Specifically, the synchronizing operation will be described with the upper half ring-shaped portion of the lever 7 as an example. Hereinbelow, the upper half ring-shaped portion is referred to simply as the lever 7 for convenience. The synchronizer device 1 is operated in accordance with sliding movement of the sleeve 6. The sleeve 6, the lever 7, the multifunctional spring 8, the synchronizer ring 5 and the gear piece 41 are schematically illustrated in FIGS. 3A, 3B and 3C. Further, the front surface 74 of the half ring-shaped portion of the lever 7 faces the clutch hub 3 that is not shown in FIGS. 3A, 3B and 3C.

Figure 3A:
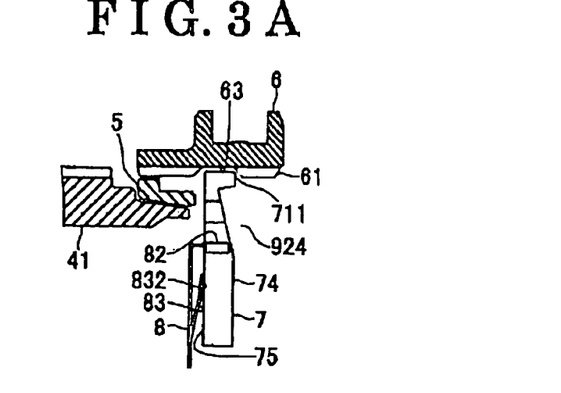
FIG. 3A is a diagram schematically illustrating the synchromesh in a neutral state.

In the neutral state before the sleeve 6 is slid, as illustrated in FIG. 3A, the key portion 711 of the lever 7 is engaged with the recessed portion 63 of the spline 61 formed on the sleeve 6. In this state, the clutch hub 3 (not shown in FIG. 3A) and the gear piece 41 are not integrally rotated.

When the synchromesh is in the neutral state, the lever 7 is retained between the clutch hub 3 and the synchronizer ring 5. The lever 7 receives the biasing force outwardly towards the sleeve 6 from the upwardly biasing portions 82 of the multifunctional spring 8 at the inner circumferential surface of the lever 7. At the same time, the lever 7 receives the biasing force at the rear surface 75 thereof from each of the retracting biasing portions 83 towards the clutch hub 3. The lever 7 is biased by the each of the retracting biasing portions 83 towards the clutch hub 3 at places where the lever 7 has a constant thickness. Hence, the lever 7 always closely contacts the clutch hub 3.

Figure 3B:
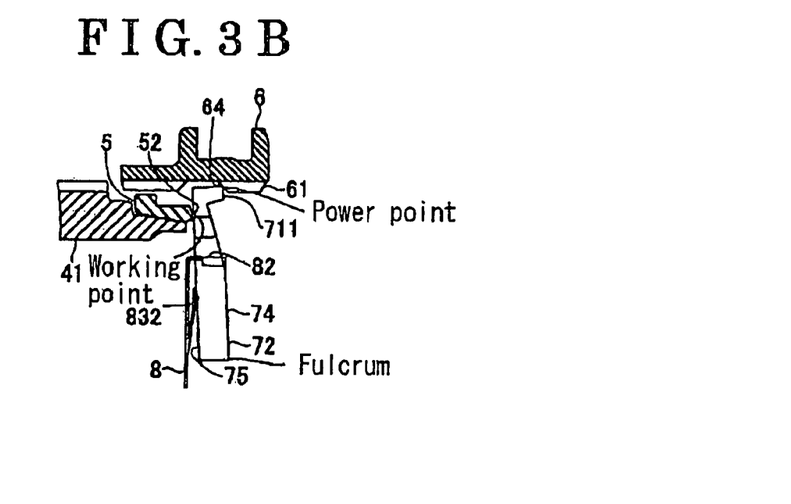
FIG. 3B is a diagram schematically illustrating a state of the synchromesh when a shift change operation is conducted.
Figure 3C:
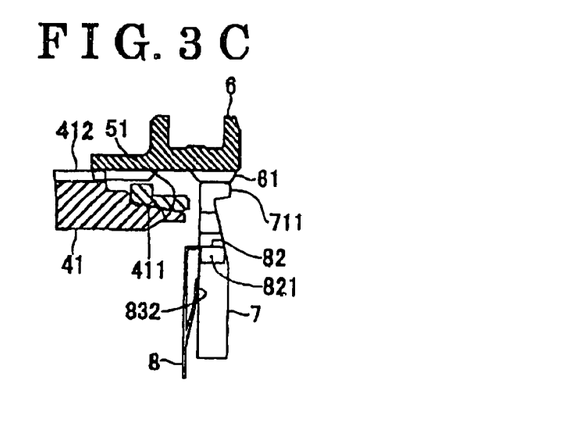
FIG. 3C is a diagram schematically illustrating a state of the synchromesh after the shift change operation is completed.

When the sleeve 6 is slidably moved towards the gear piece 41 in the axial direction of the shaft 2 from the neutral state, as illustrated in FIG. 3B, the inclined surface 64 press-contacts the key portion 711 of the lever 7. As a result, the lever 7 is pressed against the biasing force applied by each of the retracting biasing portions 83 towards the gear piece 41 in a sliding direction of the sleeve 6.

The lever 7 transmits pressing force received at the inclined surface 64 to the synchronizer ring 5. The pressing force is generated by the sleeve 6 being moved towards the gear piece 41 so as to engage the inclined surface 64 (tapered surface 64?) of the spline 61 formed on the sleeve 6 with the key portion 711 of the lever 7. Specifically, the key portion 711 of the lever 7 functions as the point where the pressing force is applied (power point), the end portion 72 of the front surface 74 function as the fulcrum, and a contacting portion of the rear surface 75 contacting the synchronizer ring 5 functions as a point of application of the pressing force (working point) to which the pressing force of the sleeve 6 is transmitted via the lever 7. The lever 7 transmits the pressing force of the sleeve 6 using the power point, the fulcrum and the working point to a contacting surface 52 of the synchronizer ring 5.

The synchronizer ring 5 is moved towards the gear piece 41 by receiving the pressing force at the contacting surface 52. When the sleeve 6 is further moved towards the gear piece 41, as illustrated in FIG. 3C, the key portion 711 of the lever 7 is disengaged from the inclined surface 64 against the biasing force of the retracting biasing portions 83 towards the sleeve 6, and then the key portion 711 of the lever 7 is inserted along the inner circumferential surface of the spline 61 of the sleeve 6. When the lever 7 is moved so as to be engaged with the inner circumferential surface of the spline 61 of the sleeve 6, the end portions of the outwardly biasing portions 82 is deformed inwardly towards the shaft axis of the shaft 2. Therefore, the key portion 711 of the lever 7 is disengaged from the inclined surface 64 of the spline 61 formed on the sleeve 6. As a result, the pressing force of the sleeve 6 is not applied to the lever 7.

In the above-mentioned manner, the synchronizing operation between the clutch hub 3 and the gear piece 4 is implemented by gradually increasing frictional force generated by the inner conical surface 51 of the synchronizer ring 5 being pressed with the outer conical surface 411 of the gear piece 41. After the synchronizing operation is completed, the sleeve 6 is further slid towards the gear piece 41, and then a shifting operation is completed.

A series of the synchronizing operation is conducted while the lever 7 is always biased towards the clutch hub 3 by the retracting biasing portions 83. Hence, posture of the lever 7 is retained stably between the clutch hub 3 and the synchronizing ring 5 even when the shifting operation in which the inclined surfaces 64 of the sleeve 6 are engaged with the key portions 711 of the lever 7 is implemented, or even when other shifting operations which do not involve engagement between the inclined surface 64 and the sleeve 6 is implemented or, even when the synchromesh is in the neutral state.

According to the synchronizer device 1 of the embodiment, the multifunctional spring 8 achieves the functions of the outwardly biasing portions 82 that bias the lever 7 outwardly towards the sleeve 6 and the retracting biasing portions 83 that retain the state where the lever 7 being always biased towards the clutch hub 3. Hence, the synchromesh 1 of the embodiment achieves an effective synchronizing operation of the lever-type synchronizer device of the known art in which the synchronizing operation is conducted with less operational force. In other words, the synchromesh 1 of the embodiment achieves the same function of the lever-type synchronizer device of the known art with fewer components. As a result, manufacturing costs of the synchronizer device 1 of the embodiment may be reduced.

The present invention is not limited on the above-mentioned embodiment, however, the modifications and changes may be applied. For example, the function of the multifunctional spring 8 may be achieved as long as the multifunctional spring 8 is formed to include a first biasing portion that biases the lever 7 outwardly towards the sleeve 6 and a second biasing portion that biases the lever 7 towards the clutch hub 3.

Further, in this embodiment, the synchronizing operation is described with the clutch hub 3 fixed on the shaft 2 as the first rotating member and the gear 4 provided at the shaft 4 so as to be rotated relative to the shaft 2 as the second rotating member. However, the synchronizer device 1 may be modified to include the second rotating member that is fixed on the shaft 2 and the first rotating member that is rotated relative to the shaft 2.

According to the embodiment, the functions of the outwardly biasing portions 82 and the retracting biasing portions 83 are achieved by the multifunctional spring 8. As a result, the synchronizer device 1 of the embodiment achieves the synchronizing operation of the lever-type synchronizer device of the known art with fewer components. In the synchronizer device of the know art, a C-shaped spring is adopted as a portion for biasing the lever outwardly towards the sleeve. In the known art, the C-shaped spring functions as an elastic body by narrowing opening of the C-shaped ring in order to deform the C-shaped ring. On the other hand, in this embodiment, the multifunctional spring 8 made of a plate shaped body and in a ring shape, that does not deform itself, is employed instead of the C-shaped ring. The main body 81 of the multifunctional spring 8 includes the outwardly biasing portions 82 and the retracting biasing portions 83 so that the main body 81 is not deformed in accordance to deformation of the outwardly biasing portions 82 and the retracting biasing portions 83. The outwardly biasing portions 82 are vertically formed on the main body 81 relative to a biasing direction towards the sleeve 6. Similarly, the retracting biasing portions 83 are vertically formed on the main body 81 relative to a biasing direction towards the clutch hub 3. As a result, a size of the multifunctional spring 8 may be minimized without taking into account space necessary for deforming the outwardly biasing portions 82 and the retracting biasing portions 83. For example, when the multifunctional spring 8 is configures so as to be penetrated by the shaft 2 through the center of the multifunctional spring 8, the size of the multifunctional spring 8 may be minimized without taking into account space necessary for deformation, comparing a configuration of the C-shaped spring. Hence, a size of synchronizer device 1 may be minimized.

The synchronizer device 1 of the embodiment synchronizes the rotation of the clutch hub 3 with the rotation of the gear 4. According to the synchronizer device 1 of the embodiment, pressing force of the sleeve 6 pressing the synchronizer ring 5, or distance of the synchronizer ring 5 being moved may be increased by adjusting a positional relationship between the power points on the lever 7 and the working points on the lever 7.

The synchronizer device 1 of the embodiment may effectively transmit torque between the clutch hub 3 and the gear 4 by adding the function of connecting the rotation of the clutch hub 3 and the rotation of the gear 4 by means of the sleeve 6.

Further, the multifunctional spring 8 may be formed by the sheet material being processed through a deformation processing, for example, pressing.

According to the embodiment, the synchronizer device 1 achieves the function of the lever-type synchronizer device with fewer components without degrading the function of the synchronizing operation of the lever-type synchronizer device of the known art. In other words, the synchronizer device 1 achieves effective synchronizing operation of the lever-type synchronizer device of the known art with fewer components. As a result, the manufacturing costs of the synchronizer device 1 of the embodiment may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:
1. A synchronizer device comprising:
a first rotating member provided at a shaft;

a second rotating member rotated relative to a shaft axis of the shaft, and including a conical body facing the first rotating member, the conical body forming an outer conical surface;

a synchronizer ring having an inner conical surface contacting the outer conical surface of the conical body of the second rotating member, and arranged between the first rotating member and the second rotating member, the synchronizer ring being movable in an axial direction of the first rotating member and integrally rotated with the first rotating member;

a sleeve provided at an outer circumference of the first rotating member, and the sleeve being slidable in the axial direction of the first rotating member;

a lever provided at an inner circumference of the sleeve and arranged between the first rotating member and the synchronizer ring, the lever including a power point at which the lever receives a pressing force in accordance with the sliding movement of the sleeve towards the second rotating member, the lever pressing the synchronizer ring towards the second rotating member by using the principle of leverage; and a retracting member including a main body, an outwardly biasing portion for pressing the lever outwardly towards the sleeve, and a retracting biasing portion for biasing the lever away from the synchronizer ring and toward the first rotating member, wherein the outwardly biasing portion and the retracting biasing portion are integrally formed on the retracting member.

2. The synchromesh according to claim 1, wherein the retracting member is formed by a sheet material being processed through deformation processing, so that the outwardly biasing portion and the retracting biasing portion are integrally formed with the main body.

3. The synchronizer device according to claim 1, wherein the outwardly biasing portion is integrally formed on the main body of the retracting member so as to radially outwardly and axially protrude from an outer circumferential surface of the main body, and the retracting biasing portion is integrally formed so as to radially outwardly protrude from the main body at a portion of the outer circumferential surface so as to be perpendicular to the upwardly biasing portion.

4. The synchronizer device according to claim 1, wherein the retracting member further includes a fixing portion for fixing the retracting member to the first rotating member.

* * * * *